No. 620,909. Patented Mar. 14, 1899.
P. GERLACH.
SOD TRIMMER.
(Application filed June 11, 1898.)
(No Model.)
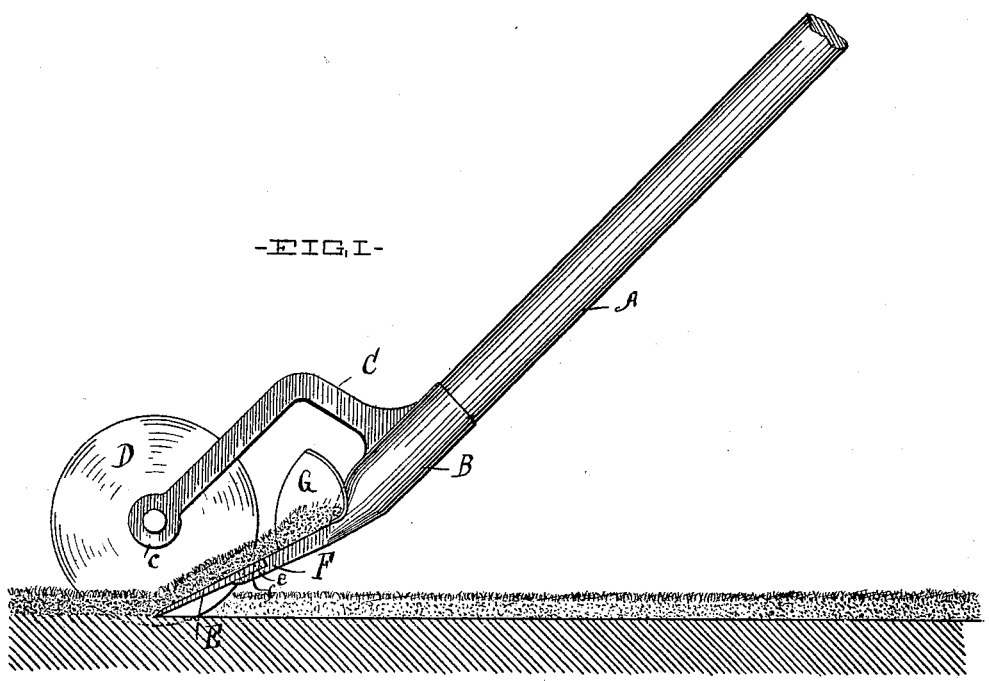
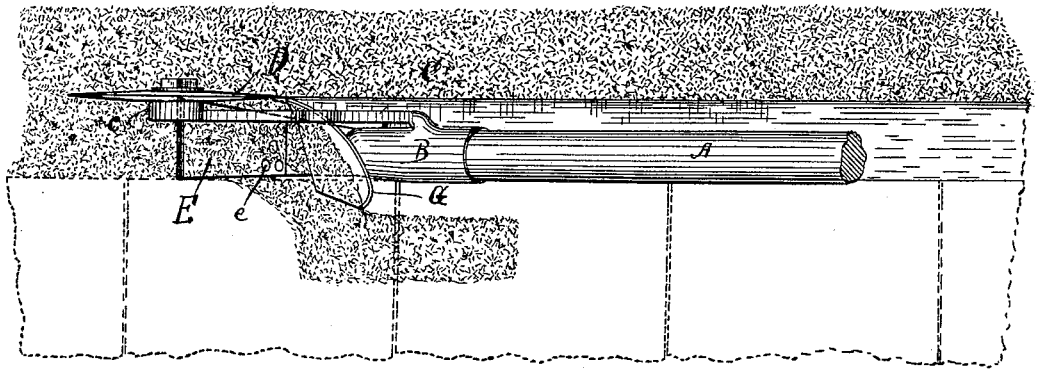
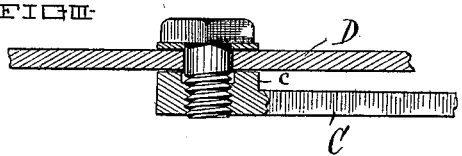
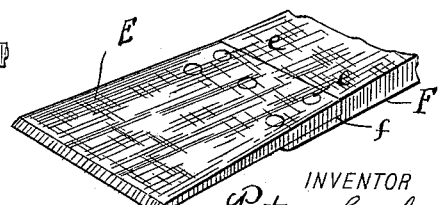
WITNESSES:
Daniel E. Daly.
Anna H. Paratt.
INVENTOR
Peter Gerlach
BY
Lynch Cornett Connell
ATTORNEYS

UNITED STATES PATENT OFFICE.

PETER GERLACH, OF CLEVELAND, OHIO.

SOD-TRIMMER.

SPECIFICATION forming part of Letters Patent No. 620,909, dated March 14, 1899.

Application filed June 11, 1898. Serial No. 683,204. (No model.)

*To all whom it may concern:*

Be it known that I, PETER GERLACH, of Cleveland, county of Cuyahoga, and State of Ohio, have invented certain new and useful Improvements in Sod-Trimmers; and I do hereby declare the following to be a full, clear, and exact description of the invention, such as will enable others skilled in the art to which it pertains to make and use the same.

My invention relates to a device or tool for trimming sod, and more especially to such a device as is adapted to trim the sod on the border of walks or roads.

My invention is adapted more especially as a hand-tool, and the arrangement of the parts is such that the tool is intended to be pushed or driven by the operator.

My invention consists of a wheel colter or cutter located in advance of a lifter or plow in such a manner as to adapt the colter or cutter as it is driven into the sod to determine the width of the cut, and thus form the straight edge. The lifter or plow lifts the section of sod and throws or guides it to one side. The colter and lifter or plow are secured to a ferrule, which in turn is secured to the lower end of the handle.

My invention consists also in other details of construction, which will hereinafter be fully set forth and claimed.

In the drawings, Figure I is a view in side elevation of a tool or trimmer constructed according to my invention, illustrating the tool and its operation while at work. Fig. II is a view looking down upon the tool. Figs. III and IV are sectional views illustrating more clearly some of the details of construction.

A represents a handle which is of any suitable length and by means of which the tool is operated or handled.

B represents a ferrule secured to the lower end of the handle A. The ferrule B in the construction shown is preferably formed of cast metal and is provided at one side with an arm or bracket C. The arm or bracket C is preferably formed integral with the bushing B and at its free end is formed with a boss $c$, which is preferably offset, as illustrated in Fig. III. The function of the offset portion of the boss $c$ is to form a clearance for the colter or cutter.

D represents the colter or cutter, which, as is usual in this class of cutters, is formed of disk shape and with a cutting edge. The colter or cutter is loosely mounted at the free end of the arm or bracket C, so as to be free to revolve as the tool is advanced.

E represents the point or share of the tool, which is formed, preferably, of plate-steel and secured to a shoe F, located on the lower end of the ferrule B. The method of securing the point or share is preferably by means of rivets $e$. The point or share is so secured to the shoe F as to be flush with the upper surface of said shoe, and this is accomplished by forming a seat $f$ at the extreme end of the shoe of a depth equal to the thickness of the metal forming the share. The share E is provided with a chisel-shaped extreme cutting edge, the bevel of which extends upward and rearward, and at this end the share comes in contact with or is in close juxtaposition to the wheel-colter D, the object of which will be hereinafter set forth.

G represents a moldboard located to the rear of the share E and is preferably formed integral with the ferrule B. The function of the moldboard G is to turn aside the lifted sod when the tool is in operation and deposit the same out of the channel cut by the colter D and share E.

In Fig. III of the drawings I have illustrated one method of securing the colter D to the arm C, and in this figure I have shown a headed stud which forms a bearing for the said colter. Still, if desired or found necessary, this method of securing the colter to the arm may be modified, as may also other details of the construction.

The operation of the tool or trimmer is as follows: When it is desired to trim a lawn, near the border of a walk or road, all that is necessary is to press the colter D into the sod at a point close to the walk or road, guiding the tool by the edge of the walk or pavement, as illustrated in Fig. II, the edge of the share following the edge of the pavement. The colter D being in advance of the shear or lifter separates the edge of the sod from the lawn and forms an edge on the lawn at equal distance throughout from the pavement. The shear or lifter E passes beneath the trimmed edge, lifts it, and throws the lifted sod to one side or onto the pavement or road, where it may be easily collected and removed, leaving a dividing-line between the lawn and the pavement of uniform width and forming an edging to the lawn pleasing in appearance.

The object in placing the toe or chiseled edge of the share E in close juxtaposition to the colter D is to form a dividing-line, so that when the trimmed edge is lifted it is not ragged in appearance, but leaves the edge of the lawn smooth and even. It will be noticed also by referring to Fig. I of the drawings that the share at its cutting edge is slightly within the periphery or cutting edge of the colter. The object in thus constructing the tool is to allow the colter to cut deeper through the sod than the depth of the dividing-groove, preventing the lifter or shear from raising the sod inside of its trimmed line.

What I claim is—

1. In a sod-trimmer of the type set forth, the combination with a handle having a ferrule secured to its lower end, and an arm extending from one side of said ferrule and formed integral with said ferrule, a colter or cutter secured to the outer end of said arm, and a share located at the end of said ferrule and at an angle to the axes of the same; the cutting edge of said share being above the cutting edge of the colter, and at one edge in close contact with said colter, substantially as set forth.

2. The combination with a handle; of a ferrule provided at one side with an arm or bracket formed integral with said ferrule; a colter secured to the outer end of said arm or bracket, and a share and moldboard located at the end of the ferrule for lifting and guiding the severed sod, said lifter being at an angle to the axes of the ferrule and at one edge being in close juxtaposition to the colter, substantially as and for the purpose set forth.

3. The combination with a handle, A, a ferrule, B, a bracket, C, said bracket located at one side of said ferrule and having a colter operatively connected to its free end; of a share or lifter located at the end of the ferrule B and at an angle to the axes of the same, the cutting edge of said share being above the cutting edge of the colter and in close juxtaposition thereto; with a moldboard, G, located to the rear of the share all substantially as and for the purpose set forth.

Signed by me at Cleveland, Ohio, this 24th day of May, 1898.

PETER GERLACH.

Witnesses:
W. E. DONNELLY,
ANNA H. PARRATT.